US011881227B2

(12) United States Patent
Jang et al.

(10) Patent No.: US 11,881,227 B2
(45) Date of Patent: Jan. 23, 2024

(54) AUDIO SIGNAL COMPRESSION METHOD AND APPARATUS USING DEEP NEURAL NETWORK-BASED MULTILAYER STRUCTURE AND TRAINING METHOD THEREOF

(71) Applicants: Electronics and Telecommunications Research Institute, Daejeon (KR); Industry-Academic Cooperation Foundation, Yonsei University, Seoul (KR)

(72) Inventors: In Seon Jang, Daejeon (KR); Seung Kwon Beack, Daejeon (KR); Jong Mo Sung, Daejeon (KR); Tae Jin Lee, Daejeon (KR); Woo Taek Lim, Daejeon (KR); Byeong Ho Cho, Daejeon (KR); Hong Goo Kang, Seoul (KR); Ji Hyun Lee, Seoul (KR); Chan Woo Lee, Seoul (KR); Hyung Seob Lim, Seoul (KR)

(73) Assignees: ELECTRONICS AND TELECOMMUNICATIONS RESERCH INSTITUTE, Daejeon (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 18/097,054

(22) Filed: Jan. 13, 2023

(65) Prior Publication Data

US 2023/0267940 A1 Aug. 24, 2023

(30) Foreign Application Priority Data

Feb. 22, 2022 (KR) ........................ 10-2022-0022902

(51) Int. Cl.
*G10L 19/04* (2013.01)
*G10L 19/038* (2013.01)
(Continued)

(52) U.S. Cl.
CPC .......... *G10L 19/038* (2013.01); *G10L 19/002* (2013.01); *G10L 19/0204* (2013.01);
(Continued)

(58) Field of Classification Search
CPC ......... G10L 19/04; G10L 19/06; G10L 19/08; G10L 19/09; G10L 19/12; G10L 19/13; G10L 19/0204
See application file for complete search history.

(56) References Cited

U.S. PATENT DOCUMENTS 5,737,716 A * 4/1998 Bergstrom .............. G10L 19/02 704/E19.01
2013/0110507 A1 * 5/2013 Gao ........................ G10L 19/04 704/219
(Continued)

FOREIGN PATENT DOCUMENTS

EP 3 799 433 3/2021

*Primary Examiner* — Feng-Tzer Tzeng
(74) *Attorney, Agent, or Firm* — KILE PARK REED & HOUTTEMAN PLLC

(57) ABSTRACT

A method, executed by a processor for compressing an audio signal in multiple layers, may comprise: (a) restoring, in a highest layer, an input audio signal as a first signal; (b) restoring, in at least one intermediate layer, a signal obtained by subtracting an upsampled signal, which is obtained by upsampling the audio signal restored in the highest layer or an immediately previous intermediate layer, from the input audio signal as a second signal; and (c) restoring, in a lowest layer, a signal obtained by subtracting an upsampled signal, which is obtained by upsampling the audio signal restored in an intermediate layer immediately before the lowest layer, from the input audio signal as a third signal, wherein the first (Continued)

signal, the second signal, and the third signal are combined to output a final restoration audio signal.

20 Claims, 3 Drawing Sheets

(51) Int. Cl.

| | |
|---|---|
| ***G10L 19/002*** | (2013.01) |
| *G10L 19/12* | (2013.01) |
| *G10L 19/08* | (2013.01) |
| *G10L 19/09* | (2013.01) |
| *G10L 19/06* | (2013.01) |
| *G10L 19/13* | (2013.01) |
| *G10L 19/02* | (2013.01) |

(52) U.S. Cl.
CPC .............. *G10L 19/04* (2013.01); *G10L 19/06* (2013.01); *G10L 19/08* (2013.01); *G10L 19/09* (2013.01); *G10L 19/12* (2013.01); *G10L 19/13* (2013.01)

(56) References Cited

U.S. PATENT DOCUMENTS

| | | | |
|---|---|---|---|
| 2019/0164052 | A1 | 5/2019 | Sung et al. |
| 2020/0252629 | A1 | 8/2020 | Ye et al. |
| 2021/0005209 | A1 | 1/2021 | Beack et al. |
| 2021/0074308 | A1* | 3/2021 | Skordilis ................ G06N 3/045 |
| 2021/0195206 | A1 | 6/2021 | Hannuksela et al. |
| 2021/0343302 | A1* | 11/2021 | Gao .................... G10L 19/0204 |
| 2021/0366497 | A1 | 11/2021 | Lim et al. |
| 2022/0141462 | A1 | 5/2022 | Na et al. |
| 2022/0405884 | A1 | 12/2022 | Kim et al. |

* cited by examiner

AUDIO SIGNAL COMPRESSION METHOD AND APPARATUS USING DEEP NEURAL NETWORK-BASED MULTILAYER STRUCTURE AND TRAINING METHOD THEREOF

CROSS-REFERENCE TO RELATED APPLICATIONS

This application claims priority to Korean Patent Application No. 10-2022-0022902, filed on Feb. 22, 2022, with the Korean Intellectual Property Office (KIPO), the entire contents of which are hereby incorporated by reference.

BACKGROUND

1. Technical Field

The present disclosure relates to a technology for compressing and restoring audio signals, and more particularly, to a deep neural network-based audio signal compression method and apparatus for compressing and restoring audio signals using a multilayer structure and a training method thereof.

2. Related Art

The content described in this part simply provides background information on the present embodiment and does not constitute any conventional technology.

Among conventional audio compression techniques, a lossy compression-based method is a technique for reducing the amount of information required to store a signal in a device or transmit the signal for communication by removing some signal components in an audio signal. In addition, the conventional lossy compression-based method determines signal components to be removed based on psychoacoustic knowledge such that distortion caused by loss of some signals is not perceived as possible by general listeners. As a representative example, major audio codecs currently used in various multimedia services, such as MP3 and AAC, analyze frequency components constituting signals using traditional signal conversion techniques such as modified discrete cosine transform (MDCT), and determine the number of bits to be allocated to each frequency component according to the importance of the degree of distortion determined, along the degree of actual human perception of each frequency component, when a lower number of bits is assigned to each frequency component for encoding on the basis of the Psychoacoustic Model designed through various listening experiments. As a result, current commercial codecs have achieved quality that is almost indistinguishable from the original signal even at compression rates of about 7 to 10 times.

In recent years, efforts are continuously being made to apply the deep neural network-based deep learning technology, which is rapidly developing beyond the traditional signal processing method, to the compression of audio signals. In particular, research is being attempted to find the optimal conversion and quantization method through various data after replacing all of the bit allocation-preceding signal conversion method, the input signal-dependent bit allocation method, and the converted signal time-axis waveform signal conversion method with a deep neural network module.

However, such end-to-end deep neural network structures have drawbacks of being still limited mainly to voice signals due to their structural limitations and showing limited performance for various general acoustic signals having wider frequency band components and diverse pattern.

SUMMARY

The present disclosure has been an effort to solve the above problem, and it is an object of the present disclosure to provide a method for improving the sound quality after restoration compared to the same amount of data through improvement of encoding and decoding methods in constructing an end-to-end deep neural network structure for compressing an acoustic signal.

It is another object the present disclosure to provide a method capable of effectively performing compression even on a full-band signal having a wide bandwidth of 20 kHz or more.

It is still another object of the present disclosure to provide a training method for effective learning of a device capable of effectively performing compression even on a full-band signal having a wide bandwidth of 20 kHz or more.

According to a first exemplary embodiment of the present disclosure, a method being executed by a processor for compressing an audio signal in multiple layers may comprise: (a) restoring, in a highest layer, an input audio signal as a first signal; (b) restoring, in at least one intermediate layer, a signal obtained by subtracting an upsampled signal, which is obtained by upsampling the audio signal restored in the highest layer or an immediately previous intermediate layer, from the input audio signal as a second signal; and (c) restoring, in a lowest layer, a signal obtained by subtracting an upsampled signal, which is obtained by upsampling the audio signal restored in an intermediate layer immediately before the lowest layer, from the input audio signal as a third signal, wherein the first signal, the second signal, and the third signal are combined to output a final restoration audio signal, and the highest layer, the at least one intermediate layer, and the lowest layer each comprises an encoder, a quantizer, and a decoder.

The steps (a), (b), and (c) may each comprise: encoding, in the encoder, by downsampling the input signal; quantizing, in the quantizer, the encoded signal; and decoding, in the decoder, by up sampling the quantized signal.

The decoder, in the highest layer and the at least one intermediate layer, may have an upsampling ratio less than a downsampling ratio of the encoder.

The encoder and the decoder may be configured with a Convolutional Neural Network (CNN), and the quantizer may be configured with a vector quantizer trainable with a neural network.

The restored signal, in the at least one intermediate layer and the lowest layer, may have a sampling frequency for the corresponding layer that is greater than a sampling frequency of the restored signal in the previous layer.

The decoder of the at least one intermediate layer and the lowest layer may transmit an intermediate signal obtained inside a deep neural network structure of the decoder of a previous layer to the decoder of a subsequent layer.

The method may further comprise setting a number of bits to be allocated per layer.

According to a second exemplary embodiment of the present disclosure, an audio signal compression apparatus may comprise: a memory storing at least one instruction; and a processor executing the at least one instruction stored in the memory, wherein the at least one instruction enables the compression apparatus to perform (a) restoring, in a highest layer, an input audio signal as a first signal, (b) restoring, in at least one intermediate layer, a signal obtained by subtracting an upsampled signal, which is obtained by upsampling the audio signal restored in the highest layer or an immediately previous intermediate layer, from the input audio signal as a second signal, and (c) restoring, in a lowest layer, a signal obtained by subtracting an upsampled signal, which is obtained by upsampling the audio signal restored in an intermediate layer immediately before the lowest layer, from the input audio signal as a third signal, the first signal, the second signal, and the third signal being combined to output a final restoration audio signal and the highest layer, the at least one intermediate layer, and the lowest layer each comprising an encoder, a quantizer, and a decoder.

(a), (b), and (c) may each comprise: encoding, in the encoder, by downsampling the input signal; quantizing, in the quantizer, the encoded signal; and decoding, in the decoder, by up sampling the quantized signal.

The decoder, in the highest layer and the at least one intermediate layer, may have an upsampling ratio less than a downsampling ratio of the encoder.

The encoder and the decoder may be configured with a Convolutional Neural Network (CNN), and the quantizer may be configured with a vector quantizer trainable with a neural network.

The restored signal, in the at least one intermediate layer and the lowest layer, may have a sampling frequency for the corresponding layer that is greater than a sampling frequency of the restored signal in the previous layer.

The decoder of the at least one intermediate layer and the lowest layer may transmit an intermediate signal obtained inside a deep neural network structure of the decoder of a previous layer to the decoder of a subsequent layer.

The at least one instruction may enable the apparatus to further perform setting a number of bits to be allocated per layer.

According to a third exemplary embodiment of the present disclosure, a method being executed by a processor for training a neural network compressing an audio signal in multiple layers may comprise: (a) compressing and restoring, in each layer, an input signal; and (b) comparing and determining a signal restored in each layer and a guide signal of the corresponding layer, wherein the signal input, at step (a), to each of the layers remaining after excluding a highest layer is a signal obtained by removing an upsampled signal, which is obtained by upsampling a signal obtained by combining the signal restored in a previous layer and a guide signal of the previous layer at a predetermined ratio, from the input audio signal.

The multiple layers may each comprise a encoder, a quantizer, and a decoder.

The encoder and the decoder may be configured with a Convolutional Neural Network (CNN), and the quantizer may be configured with a vector quantizer trainable with a neural network.

The guide signal, at step (b), may comprise the guide signal of a lowest layer, which is the input audio signal, and the guide signals of the layers except the lowest layer, which are signals generated in the corresponding layers using a bandpass filter set to match the input audio signal to a frequency band of the corresponding layer.

Combining, at step (a), the signal restored in a previous layer and a guide signal of the previous layer at a predetermined ratio may comprise multiplying the restored signal of the preceding layer by $\alpha$, multiplying the guide signal of the preceding layer by '$1-\alpha$', and combining the two signals.

$\alpha$ may be set to 0 in an initial stage of learning and gradually increased to 1.

According to the present disclosure, it is possible to compress a signal having a wide bandwidth more efficiently by adopting a structure combining multiple layers handling different frequency bands instead of using a single coding layer covering all frequency bands of broadband and full-band signals and by inducing learning to separate roles between layers in the design of a deep neural network-based end-to-end compression model.

In particular, the present disclosure makes it possible to expect higher restoration performance because the subsequent layer of the present disclosure compensates for errors occurring in the previous layer in addition to inheriting the existing subband coding method.

In particular, the structural improvement of the present disclosure, which has an independent relationship with the design method of the encoder, decoder, and quantizer constituting each layer, makes it possible to expect realization of a higher design utility after the improvement of each module with the development of the deep learning technology in the future.

DETAILED DESCRIPTION OF THE EMBODIMENTS

Figure 1:
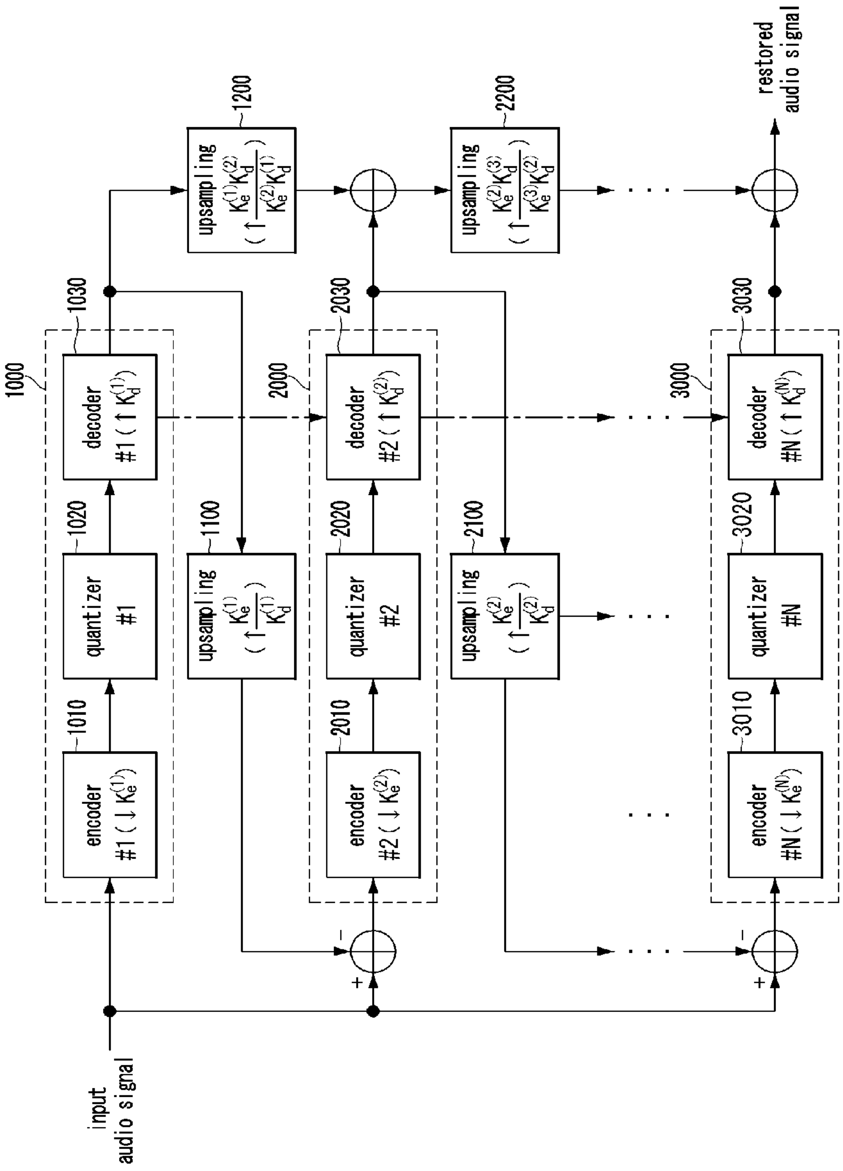
FIG. 1 is a block diagram illustrating an audio signal compression apparatus using a deep neural network-based multilayer structure according to an embodiment of the present disclosure.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a block diagram illustrating an audio signal compression apparatus using a deep neural network-based multilayer structure according to an embodiment of the present disclosure.

With reference to FIG. 1, an audio signal compression apparatus according to an embodiment of the present disclosure may include a plurality of coding layers 1000, 2000, and 3000 including encoders 1010, 2010, and 3010, quantizers 1020, 2020, and 3020, and decoders 1030, 2030, and 3030 and a plurality of upsampling modules 1100, 1200, 2100, and 2200. The plurality of coding layers 1000, 2000, and 3000 may include the highest layer 1000, the lowest layer 3000, and at least one intermediate layer 2000.

Here, because the individual coding layers 1000, 2000, and 3000 include encoders 1010, 2010, 3010, respective quantizers 1020, 2020, 3020, and respective decoders 1030, 2030, and 3030, the coding layers 1000, 2000, and 3000 may perform compression and decompression in different ways.

The encoders 1010, 2010, and 3010 may each generate a converted signal by performing conversion through a deep neural network on an input audio signal. The encoders 1010, 2010, and 3010 may be implemented as a Convolutional Neural Networks layer having a residual connection capable of converting the input audio signal to be suitable for vector quantization, which will be described later. The encoders 1010, 2010, and 3010 may downsample the input signal by a specific ratio.

The quantizers 1020, 2020, and 3020 may perform quantization by allocating the most appropriate code to the converted signal. The quantizers 1020, 2020, and 3020 may reduce the number of bits required to express an embedding vector by selecting a code vector closest to the converted signal using a vector quantized-variational autoencoder (VQ-VAE). The quantizers 1020, 2020, and 3020 may learn the VQ codebook using the VQ-related loss function in the VQ-VAE, and each layer may have its own VQ codebook.

The decoders 1030, 2030, and 3030 may pass the code transmitted from the quantizer through a deep neural network to finally restore a time-series audio signal. The decoders 1030, 2030, and 3030 may be implemented as a convolutional neural networks layer having a residual connection. The decoders 1030, 2030, and 3030 may perform upsampling of the signals received from the quantizers 1020, 2020, and 3020 by a specific ratio.

Here, in all the layers except the lowest layer 3000, i.e., the highest and intermediate layers 1000 and 2000, the upsampling ratios of the decoders 1030 and 2030 of the corresponding layers may be smaller than the downsampling ratios of the corresponding encoders 1010 and 2010. That is, signals restored in the corresponding layers 1000 and 2000 may have a lower sampling frequency than the input audio signal. Through this, the present disclosure can limit the bandwidth of the frequency that can be restored in each layer.

In addition, the encoders 1010, 2010, 3010, the quantizers 1020, 2020, 3020, and the decoders 1030, 2030, and 3030 are all configured with deep neural networks and trained through backpropagation of the calculated error between the recovered input signal and the input audio signal according to the existing deep learning training method.

In this way, it is possible, in the present disclosure, for one of the plurality of coding layers to handle only some bands rather than that one specific coding layer convert and compress all frequency bands of an input signal. It is also possible, in the present disclosure, to induce each layer to learn the characteristics of the unique signal of the frequency band corresponding thereto and resultant signal conversion and quantization methods in the network learning process.

In addition, in order to improve the restoration performance in the decoders 1030, 2030, and 3030, the intermediate signals obtained inside the deep neural network structure constituting the decoders 1030 and 2030 of the immediately previous layers may be provided to the decoders 2030 and 3030 of the corresponding layers. Here, the intermediate signals can be combined using various methods such as simply summing the intermediate signals of both sides or adding any deep neural network structure between them. However, the combining method should allow backpropagation of the loss function for network learning.

As long as the conditions for the ratio of upsampling and downsampling are satisfied in configuring each of the coding layers 1000, 2000, and 3000, the detailed internal structures of the encoder 1010, 2010, and 3010, the quantizers 1020, 2020, and 3020, and the decoders 1030, 2030, and 3030 are not bound by any special constraints, and the configuration of the entire system proposed in the present disclosure is not restricted due to the detailed structure of the internal module. Representative components constituting the encoders 1010, 2010, and 3010 and the decoders 1030, 2030, 3030 include convolutional neural network (CNN), multilayer perceptron (MLP), and various non-linear functions, and these components may be combined in any order to constitute each of the encoders 1010, 2010, and 3010, the quantizers 1020, 2020, and 3020, and decoders 1030, 2030, and 3030.

With reference to FIG. 1 again, a residual input audio signal remaining after removing the signal restored at the immediately previous coding layers 1000 and 2000 from the input audio signal may be input to the intermediate layer 2000 and the lowest layer 3000 except the highest layer 1000. In this manner, it is possible to prevent the same signal from being unnecessarily encoded several times due to the overlap of the frequency bands covered by the respective layers.

In addition, the finally restored audio signal may be determined by combining the signal restored at the lowest layer 3000 and the signals restored at the previous layers 1000 and 2000, i.e., by summing the restoration results of all the layers 1000, 2000, and 3000.

For example, the signal restored at the highest layer 1000 may be referred to as the first signal, the signal restored at the intermediate layer 2000 as the second signal, and the signal restored at the lowest layer 3000 as the third signal. The highest layer 1000 may generate the first signal by receiving the input audio signal. The intermediate layer 2000 may generate the second signal by receiving the signal obtained by removing the signal obtained by upsampling the first signal from the input audio signal. The lowest layer 3000 may generate the third signal by receiving the signal obtained by removing the signal obtained by upsampling the second signal from the input audio signal. The first signal, the second signal, and the third signal may be combined to output the final restoration audio signal. Here, the first signal and the second signal may be upsampled at a predetermined ratio for synchronization.

Figure 2:
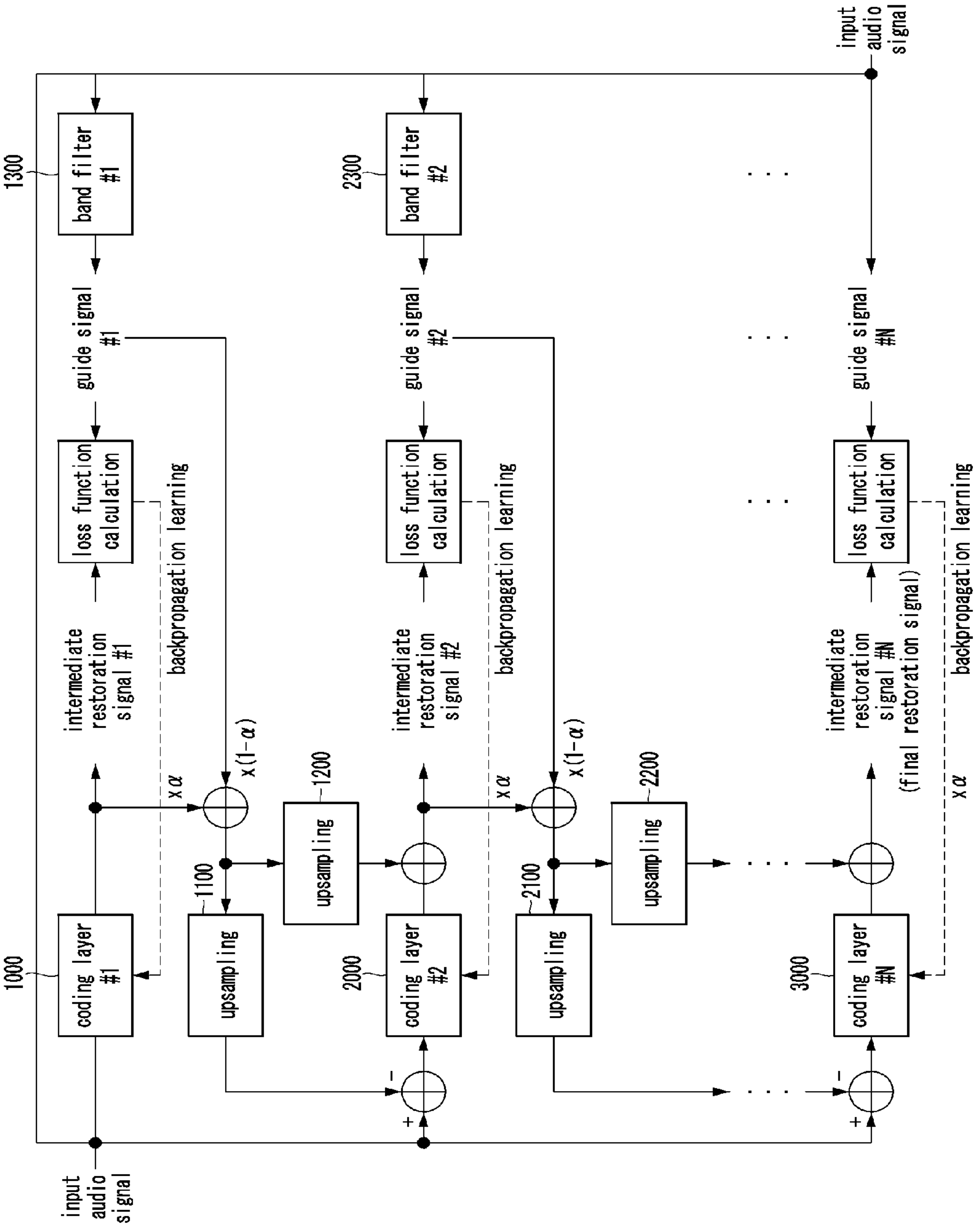
FIG. 2 is a diagram illustrating a learning method of an audio signal compression apparatus using a deep neural network-based multilayer structure according to an embodiment of the present disclosure.

FIG. 2 is a diagram illustrating a learning method of an audio signal compression apparatus using a deep neural network-based multilayer structure according to an embodiment of the present disclosure.

Since there is a difference in sampling frequency between coding layers, it is necessary to perform upsampling or downsampling by an appropriate ratio for frequency matching. In the present disclosure, it is possible to connect layers in an order from a low sampling frequency to a high sampling frequency in order for the plurality of layers to perform compression more effectively. In this case, the sampling frequencies of the signals delivered to a subsequent layer may be synchronized through upsampling as shown in FIG. 2. In addition, it is obvious that various techniques based on existing signal processing theories can be used in the upsampling modules 1100, 1200, 2100, and 2200.

However, in the case of configuring the network as described above, both the input and output of the intermediate coding layer 2000 depend on the results of the previous coding layer and, thus, it is likely that the parameters of the deep neural network constituting each layer are not properly learned, i.e., learning is not performed smoothly in the early stages of training. In addition, there is a need of criteria for more clearly dividing roles between layers because only the difference in downsampling or upsampling ratio is a factor providing differentiation between layers.

With reference to FIG. 2, in order to solve this problem, in the present disclosure, a loss function is calculated from the difference between the intermediate restoration signals generated through encoding at each of the layers 1000, 2000, and 3000 and the random guide signals given for each layer such that backpropagation learning of the deep neural network modules constituting the coding layer can be performed with the loss function. That is, the entire network may be trained not only to minimize the difference between the final restored signal and the input signal but also to minimize the difference between the signals restored in the intermediate process and the random guide signals. Here, the calculation formula of the loss function may be identical in all layers, but all the formulas are not required to be identical and may be arbitrarily adjusted for each layer.

The guide signal may be an input audio signal to which bandpass filters 1300 and 2300 are applied in accordance with the maximum frequency bandwidth that a signal restored at each of the layers 1000, 2000, and 3000 can have. As described above, the decoder 1030, 2030, and 3030 of each coding layer is configured to perform upsampling at a lower ratio than the encoder 1010, 2010, and 3010 such that the intermediate restoration signal has a low sampling frequency and a narrow bandwidth. Therefore, the guide signal needs to be given as much signal as the bandwidth that can be restored by each layer 1000, 2000, and 3000, which can be achieved by using band filter 1300 and 2300 that pass only a specific frequency band of the input audio signal by the bandwidth limit of each of the layers 1000, 2000, and 3000. For example, the guide signal of the lowest layer 3000 may be the input audio signal, and the guide signals of the intermediate layer 2000 and the highest layer 1000 may be the signals obtained by passing the input audio signal through the band filters 1300 and 2300 adjusted to the maximum frequency bandwidth of each layer 1000, 2000, and 3000. However, the band filters 1300 and 2300 should be designed such that the frequency band handled by any intermediate layer covers the frequency bands handled by all previous layers in consideration of the fact that the intermediate restoration signal of the previous layer is excluded from the compression process of the subsequent layer.

In addition, in order to compensate for the poor restoration performance of the decoders 1030, 2030 and 3030 at the beginning of training, the guide signal can be transmitted to the encoders 1010, 2010, and 3010 and the decoders 1030, 2030 and 3030 of the subsequent coding layers instead of the intermediate restoration signal obtained through the decoders 1030, 2030, and 3030 in an arbitrary intermediate layer 2000. This may be implemented by setting the value of '$\alpha$' in FIG. 2 to 0. Through this, at the beginning of training, each layer can be independently trained to compress and restore the difference between the input audio signal and the guide signal.

After the independent training for each layer using the guide signal converges, the value of a may be gradually increased to induce training such that each layer reflects the restoration result of the preceding layer. In this process, the intermediate restoration signal and the guide signal are multiplied by a ratio of '$\alpha$' and '1-$\alpha$', respectively, and then summed, and the summed signal may be transmitted to a subsequent layer through an upsampling module.

In the final training stage, training may be induced such that all coding layers can compensate for the restoration errors of previous layers by fixing the value of '$\alpha$' to 1. Here, the criteria and time for changing the value of '$\alpha$' may be arbitrarily determined according to the judgment of the designer based on the degree of convergence of the loss function.

Figure 3:
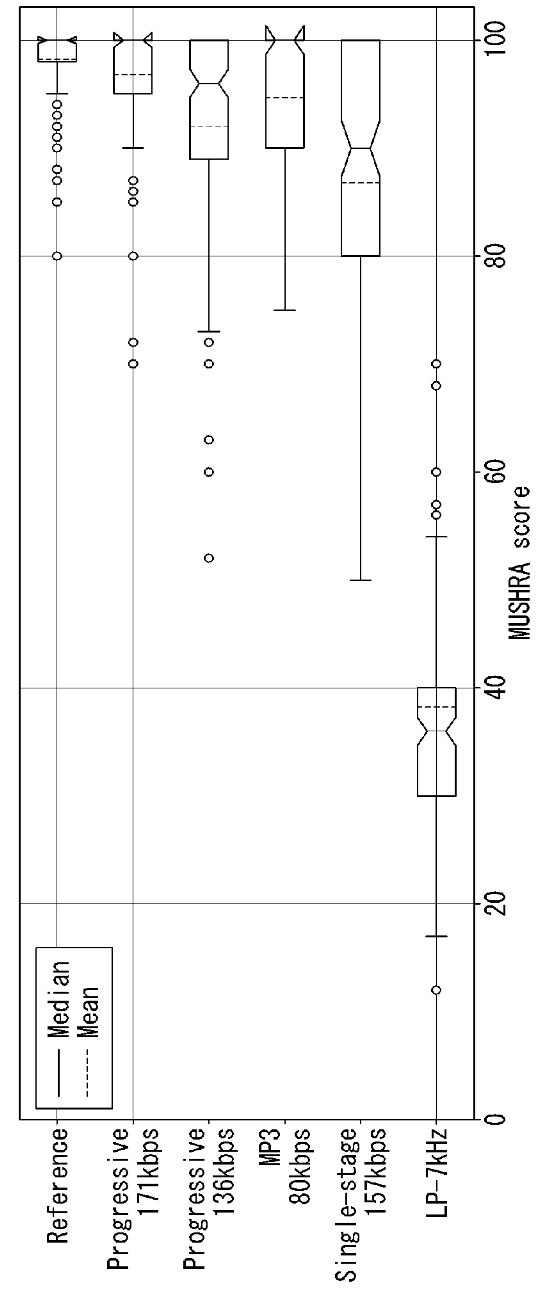
FIG. 3 is a diagram illustrating a MUSHRA Test result according to an embodiment of the present disclosure.

FIG. 3 is a diagram illustrating a MUSHRA Test result according to an embodiment of the present disclosure.

With reference to FIG. 3, the Multi-Stimulus test with Hidden Reference and Anchor (MUSHRA) Test, which is a subjective listening test, was performed with a sample to which six models were applied. The MUSHRA Test was conducted on a model (Progressive 166 Kps) generated by allocating 32 codes (5 bits) to each layer and a model (Progressive 132 kps) generated by allocating 16 codes (4 bits) to each layer according to the present disclosure. In addition, the MUSHRA test was conducted with a model generated using a single layer (Single-Stage) to check the effect according to the layer, a model to which MP3 is applied for comparison with the existing codec, and original data (reference) and a 7 kHz low-pass anchor (LP-7 kHz) for verifying the listener's evaluation adequacy.

With reference to FIG. 3, it is possible to identify that the evaluation was properly performed given that the value for the original data is high and the value for LP-7 kHz is low. In addition, it is possible to identify that restoration was performed to be more similarly to the original sound in the case of using multiple layers rather than a single layer, that the progressive 132 Kbps model with low bit allocation yielded similar results to the 80 kbps MP3 model of which excellent performance was admitted, and that the progressive 166 kbps model with higher bit allocation received better evaluation results.

In addition to the MUSHRA Test, the Virtual Speech Quality Objective Listener (ViSQOL) and Signal to Distortion Ratio (SDR) values calculated for more objective evaluation are shown in Table 1.

TABLE 1

| System | Bitrate | ViSQOL | SDR (dB) |
|---|---|---|---|
| Progressive | 166 ± 3 | 4.64 ± 0.02 | 38.27 ± 1.40 |
| | 132 ± 3 | 4.54 ± 0.04 | 31.75 ± 1.11 |
| Single-stage | 150 ± 2 | 4.19 ± 0.08 | 26.73 ± 0.77 |
| MP3 | 80 | 4.63 ± 0.01 | 24.83 ± 1.38 |

With reference to Table 1, the results are similar to those of the MUSHRA Test that is a subjective evaluation index. A model created with multiple layers shows better performance than a model created with a single layer.

Table 2 shows the results of analyzing the bit rate for each step after training is completed.

TABLE 2

| | Bitrate(kbps) | | |
|---|---|---|---|
| System | Stage 1 | Stage 2 | Stage 3 |
| Progressive | 23.7 ± 0.5 | 50.1 ± 0.7 | 92.1 ± 2.3 |
| | 18.6 ± 0.4 | 40.4 ± 0.6 | 72.6 ± 2.3 |
| Single-stage | — | — | 150.0 ± 2.1 |

The bit rate of each layer was calculated based on the ratio of entropy and code vector of the codebook in consideration of entropy coding. With reference to Table 2, the bit rate of the third stage designed to convert the highest frequency band was calculated to be the largest. In view of psychoacoustic knowledge, it is possible to allocate very few bits to the high frequency component that typically has low energy and relatively less important for human perception. That is, coding efficiency can be further improved by adjusting the bits allocated to each layer based on the existing psychoacoustic knowledge.

That is, the bit allocation to each layer may be autonomously performed within the network through training, or the bits to be allocated to each layer may be set manually. For example, when the low band is important, it may be possible to allocate more bits to the highest layer 1000 and fewer bits to the intermediate and lowest layers 2000 and 3000. Also, when the intermediate band is important, it may be possible to allocate more bits to the intermediate layer 2000 and fewer bits to the highest and lowest layers 1000 and 3000. The number of bits allocated to a layer may be set by a user using fields and characteristics to which the present disclosure is applied and existing psychoacoustic knowledge.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method being executed by a processor for compressing an audio signal in multiple layers, the method comprising:

(a) restoring, in a highest layer, an input audio signal as a first signal;

(b) restoring, in at least one intermediate layer, a signal obtained by subtracting an upsampled signal, which is obtained by upsampling the audio signal restored in the highest layer or an immediately previous intermediate layer, from the input audio signal as a second signal; and (c) restoring, in a lowest layer, a signal obtained by subtracting an upsampled signal, which is obtained by upsampling the audio signal restored in an intermediate layer immediately before the lowest layer, from the input audio signal as a third signal, wherein the first signal, the second signal, and the third signal are combined to output a final restoration audio signal, and the highest layer, the at least one intermediate layer, and the lowest layer each comprises an encoder, a quantizer, and a decoder.

2. The method of claim 1, wherein the steps (a), (b), and (c) each comprises:

encoding, in the encoder, by downsampling the input signal;

quantizing, in the quantizer, the encoded signal; and decoding, in the decoder, by up sampling the quantized signal.

3. The method of claim 2, wherein the decoder, in the highest layer and the at least one intermediate layer, has an upsampling ratio less than a downsampling ratio of the encoder.

4. The method of claim 2, wherein the encoder and the decoder are configured with a Convolutional Neural Network (CNN), and the quantizer is configured with a vector quantizer trainable with a neural network.

5. The method of claim 2, wherein the restored signal, in the at least one intermediate layer and the lowest layer, has a sampling frequency for the corresponding layer that is greater than a sampling frequency of the restored signal in the previous layer.

6. The method of claim 1, wherein the decoder of the at least one intermediate layer and the lowest layer transmits an intermediate signal obtained inside a deep neural network structure of the decoder of a previous layer to the decoder of a subsequent layer.

7. The method of claim 1, further comprising setting a number of bits to be allocated per layer.

8. An audio signal compression apparatus comprising:

a memory storing at least one instruction; and a processor executing the at least one instruction stored in the memory, wherein the at least one instruction enables the compression apparatus to perform (a) restoring, in a highest layer, an input audio signal as a first signal, (b) restoring, in at least one intermediate layer, a signal obtained by subtracting an upsampled signal, which is obtained by upsampling the audio signal restored in the highest layer or an immediately previous intermediate layer, from the input audio signal as a second signal, and (c) restoring, in a lowest layer, a signal obtained by subtracting an upsampled signal, which is obtained by upsampling the audio signal restored in an intermediate layer immediately before the lowest layer, from the input audio signal as a third signal, the first signal, the second signal, and the third signal being combined to output a final restoration audio signal and the highest layer, the at least one intermediate layer, and the lowest layer each comprising an encoder, a quantizer, and a decoder.

9. The apparatus of claim 8, wherein (a), (b), and (c) each comprises:

encoding, in the encoder, by downsampling the input signal;

quantizing, in the quantizer, the encoded signal; and decoding, in the decoder, by up sampling the quantized signal.

10. The apparatus of claim 9, wherein the decoder, in the highest layer and the at least one intermediate layer, has an upsampling ratio less than a downsampling ratio of the encoder.

11. The apparatus of claim 9, wherein the encoder and the decoder are configured with a Convolutional Neural Network (CNN), and the quantizer is configured with a vector quantizer trainable with a neural network.

12. The apparatus of claim 9, wherein the restored signal, in the at least one intermediate layer and the lowest layer, has a sampling frequency for the corresponding layer that is greater than a sampling frequency of the restored signal in the previous layer.

13. The apparatus of claim 8, wherein the decoder of the at least one intermediate layer and the lowest layer transmits an intermediate signal obtained inside a deep neural network structure of the decoder of a previous layer to the decoder of a subsequent layer.

14. The apparatus of claim 8, wherein the at least one instruction enables the apparatus to further perform setting a number of bits to be allocated per layer.

15. A method being executed by a processor for training a neural network compressing an audio signal in multiple layers, the method comprising:

(a) compressing and restoring, in each layer, an input signal; and (b) comparing and determining a signal restored in each layer and a guide signal of the corresponding layer, wherein the signal input, at step (a), to each of the layers remaining after excluding a highest layer is a signal obtained by removing an upsampled signal, which is obtained by upsampling a signal obtained by combining the signal restored in a previous layer and a guide signal of the previous layer at a predetermined ratio, from the input audio signal.

16. The method of claim 15, wherein the multiple layers each comprise a encoder, a quantizer, and a decoder.

17. The method of claim 16, wherein the encoder and the decoder are configured with a Convolutional Neural Network (CNN), and the quantizer is configured with a vector quantizer trainable with a neural network.

18. The method of claim 15, wherein the guide signal, at step (b), comprises the guide signal of a lowest layer, which is the input audio signal, and the guide signals of the layers except the lowest layer, which are signals generated in the corresponding layers using a bandpass filter set to match the input audio signal to a frequency band of the corresponding layer.

19. The method of claim 15, wherein combining, at step (a), the signal restored in a previous layer and a guide signal of the previous layer at a predetermined ratio comprises multiplying the restored signal of the preceding layer by $\alpha$, multiplying the guide signal of the preceding layer by '1-$\alpha$', and combining the two signals.

20. The method of claim 19, wherein $\alpha$ is set to 0 in an initial stage of learning and gradually increased to 1.

* * * * *